(12) United States Patent
Solheim (10) Patent No.: US 9,429,476 B2
(45) Date of Patent: Aug. 30, 2016

(54) CORRECTING NONCONTACT INFRARED THERMOMETER DATA BY REMOVING CONTAMINATION OF THE INTERVENING ATMOSPHERE

(75) Inventor: Fredrick S. Solheim, Boulder, CO (US)

(73) Assignee: Frederick S. Solheim, Boulder, CO (US)

( * ) Notice: Subject to any disclaimer, the term of this patent is extended or adjusted under 35 U.S.C. 154(b) by 1111 days.

(21) Appl. No.: 13/134,264

(22) Filed: Jun. 3, 2011

(65) Prior Publication Data

US 2012/0310578 A1    Dec. 6, 2012

(51) Int. Cl.
| | |
|---|---|
| G01K 1/16 | (2006.01) |
| G06F 3/01 | (2006.01) |
| G06F 3/03 | (2006.01) |
| G06F 7/00 | (2006.01) |
| G01K 1/00 | (2006.01) |

(52) U.S. Cl.
CPC ........................ G01K 1/00 (2013.01)

(58) Field of Classification Search
CPC .............................. G01K 11/00; G01K 11/003
USPC ................ 702/3, 99; 73/170.16, 170.27, 29; 324/76.14; 429/483
See application file for complete search history.

(56) References Cited

U.S. PATENT DOCUMENTS

| | | | |
|---|---|---|---|
| 4,873,481 A * | 10/1989 | Nelson et al. | ................ 324/640 |
| 5,526,676 A * | 6/1996 | Solheim et al. | ............. 73/29.01 |
| 5,612,901 A | 3/1997 | Gallegos et al. | |
| 5,621,526 A | 4/1997 | Kuze | |
| 5,653,537 A * | 8/1997 | Ignatowicz et al. | .......... 374/131 |
| 5,715,684 A * | 2/1998 | Watanabe et al. | ................ 62/3.2 |
| 5,730,527 A * | 3/1998 | Takayama et al. | ........... 374/131 |
| 6,035,710 A | 3/2000 | Hutchison et al. | |
| 7,052,176 B2 | 5/2006 | Stephan et al. | |
| 7,353,690 B2 * | 4/2008 | Solheim et al. | ............. 73/29.01 |
| 7,472,590 B2 | 1/2009 | Solheim et al. | |
| 2005/0184740 A1 * | 8/2005 | Ware et al. | ................... 324/640 |
| 2006/0164063 A1 * | 7/2006 | Solheim et al. | ........... 324/76.14 |
| 2008/0264164 A1 * | 10/2008 | Solheim et al. | ........... 73/170.27 |

OTHER PUBLICATIONS

Turner Retreiving cloud fraction in the field of view of a high spectral resolution infrared radiometer, Geoscience and Remote Sensing Letter IEEE vol. 2 Jul. 2005.*

* cited by examiner

Primary Examiner — Gregory J Toatley
Assistant Examiner — Felix Suarez
(74) Attorney, Agent, or Firm — Harold A. Burdick (57) ABSTRACT

Apparatus and methods are disclosed for enhancing data accuracy of a noncontact infrared thermometer. One method includes determining dry atmospheric constituency and water vapor absorption coefficients across the infrared thermometers spectral bandpass and implementing the coefficients in processing with site-based atmospheric temperature and water vapor density profile and pressure measurements to provide corrected target temperature data compensating for contamination in said raw data due to said intervening atmosphere. The method is particularly well adapted for use in correcting data from less expensive but also less accurate wideband infrared thermometers.

19 Claims, 10 Drawing Sheets

CORRECTING NONCONTACT INFRARED THERMOMETER DATA BY REMOVING CONTAMINATION OF THE INTERVENING ATMOSPHERE

FIELD OF THE INVENTION

This invention relates to methods and apparatus for accurate noncontact infrared thermometer readings, and, more particularly, relates to accuracy enhancement of commercially available noncontact infrared thermometers.

BACKGROUND OF THE INVENTION

Figure 1A:
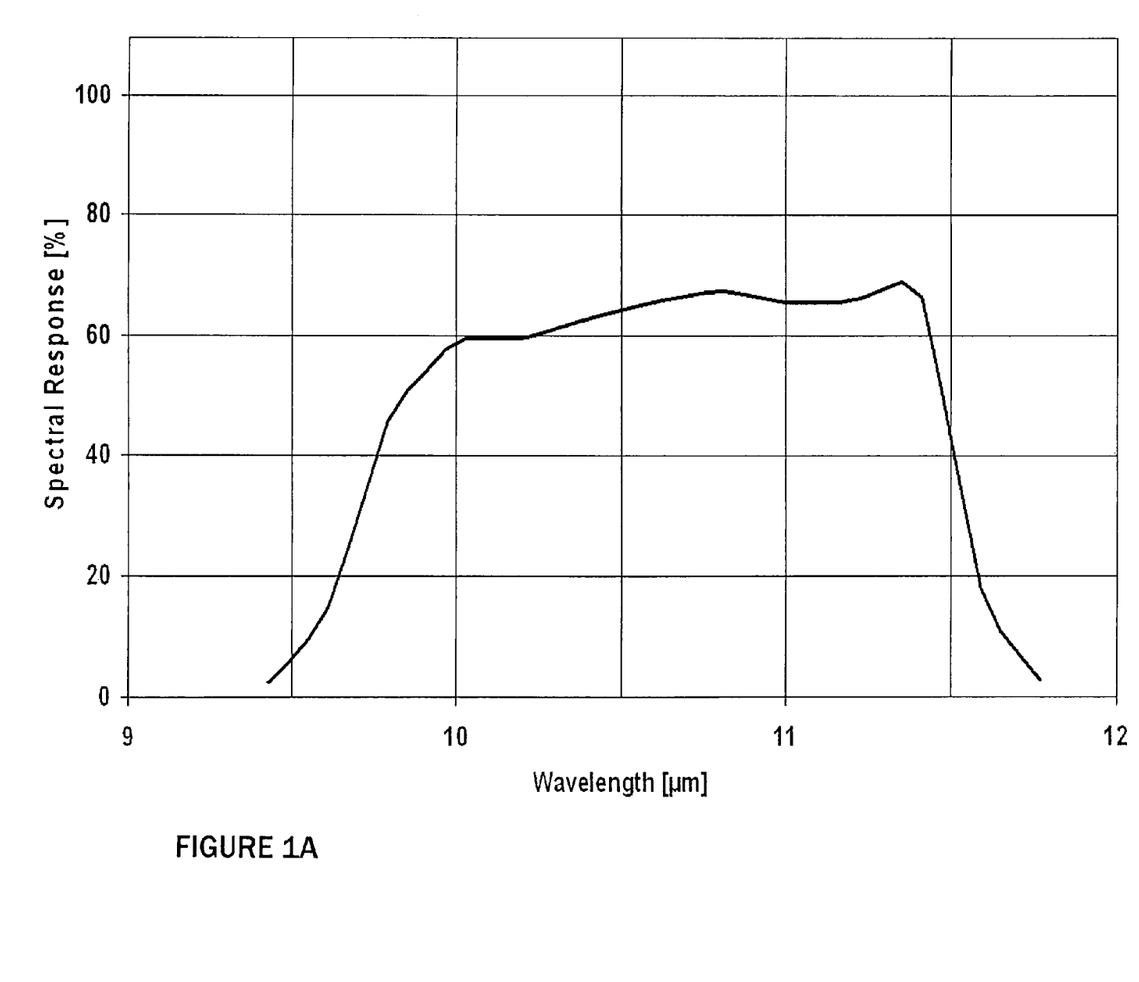
FIGS. 1A and 1B are plots of narrowband and wideband, respectively, infrared thermometer detection sensitivity.
Figure 2A:
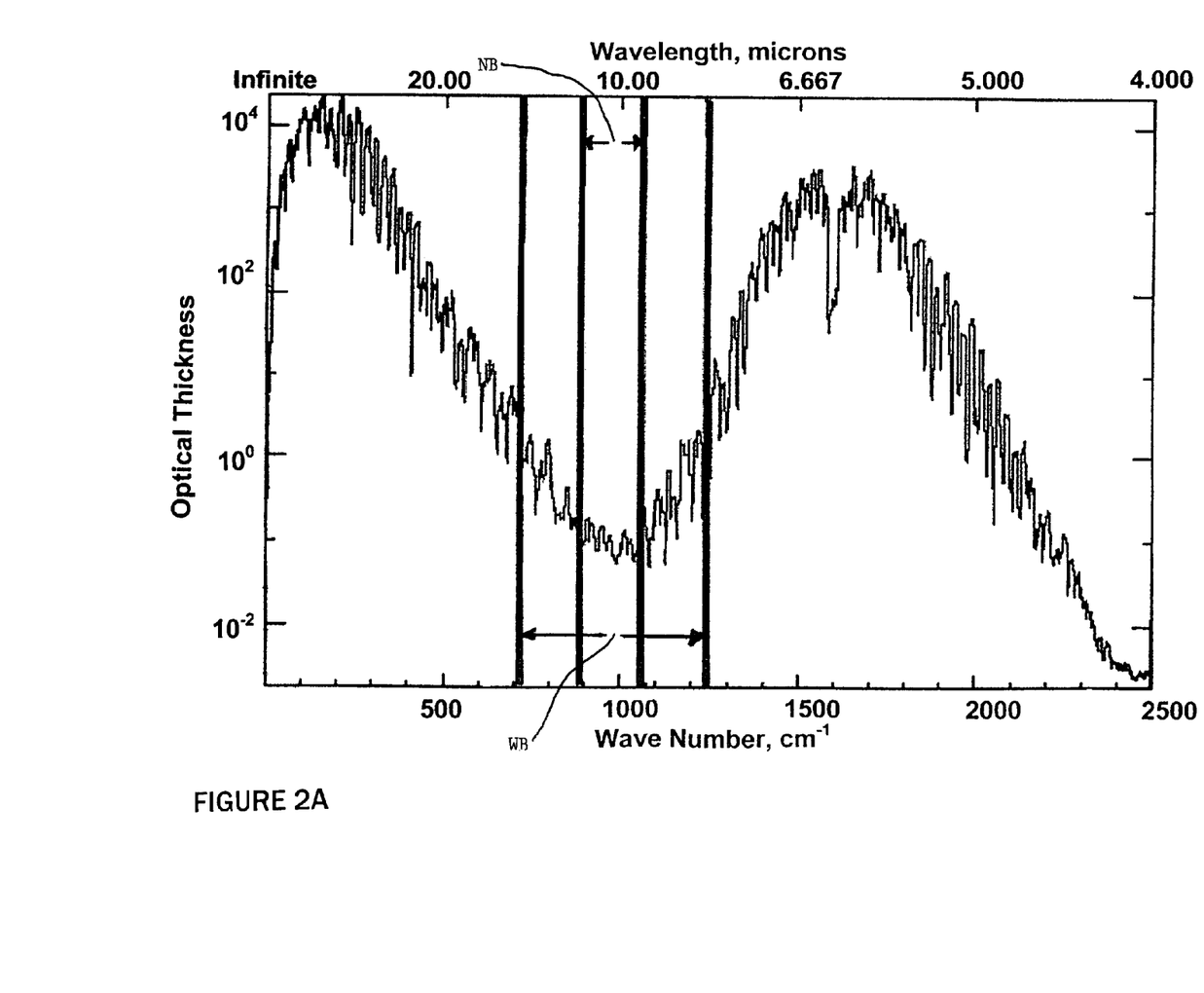
FIG. 2A is a graph illustrating water vapor absorption spectrum in the region around 10 microns.
Figure 2B:
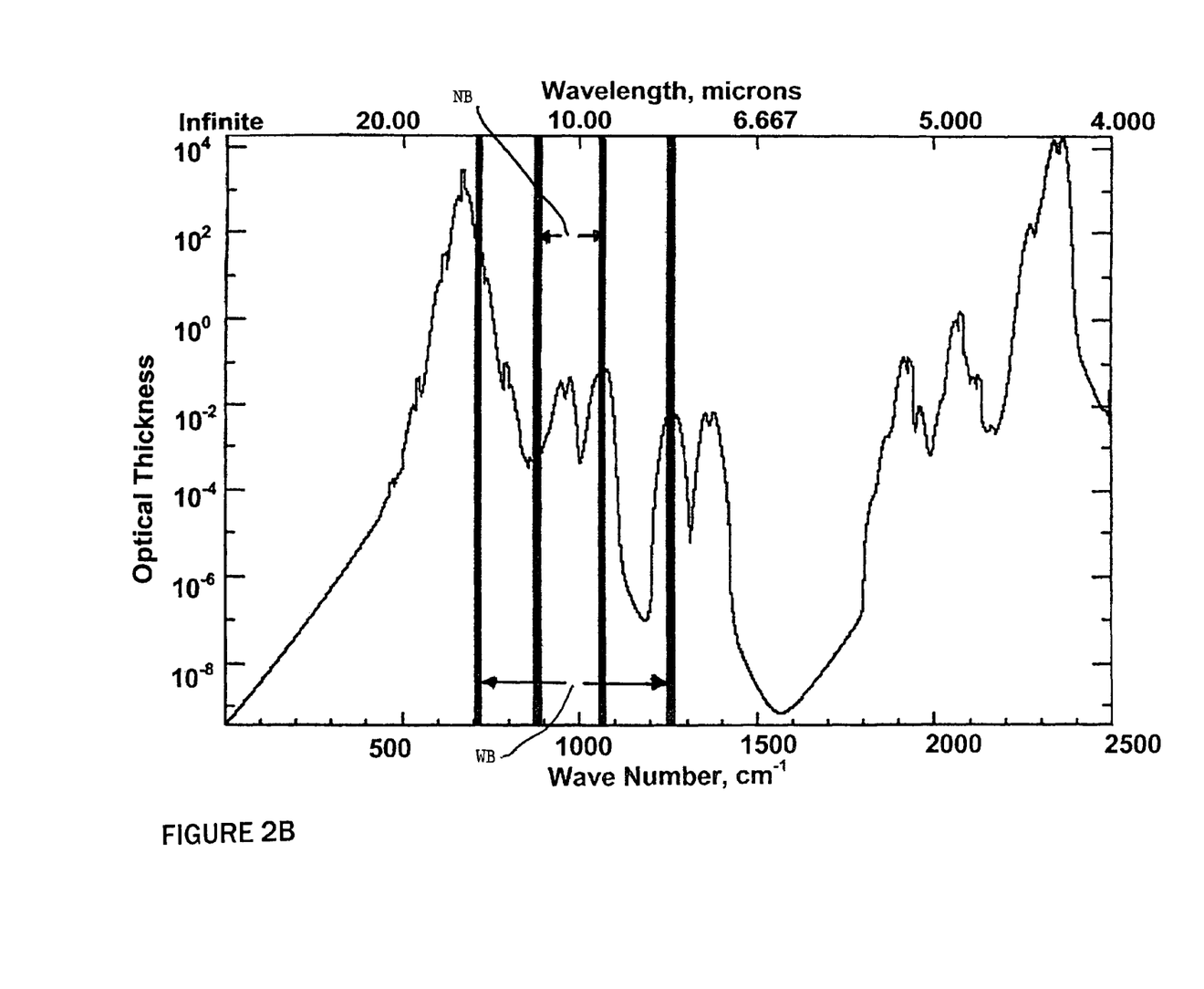
FIG. 2B is a graph illustrating $CO_2$ absorption spectrum in the region around 10 microns.

The semitransparent atmospheric window between about 9.5 and 11.3 microns of wavelength is typically used to remotely measure the temperature of cloud margins and other targets and infrared emitters viewed through the atmosphere with noncontact infrared thermometers (see for example FIG. 1A illustrating exemplary detector sensitivity in that window). This window enables measurements with a minimum of error-inducing contributions of the intervening atmosphere (see, for example, of the low contributions attributable to water vapor and $CO_2$ and other gases in FIGS. 2A and 2B, respectively). This has applications in surface-based upward looking and top-down and horizontal path passive microwave radiometry, weather observations and forecasting, weather and cloud physics research, military applications such as target discrimination and battlescene infrared visibility and other remote sensing applications wherein the true temperature of the remotely sensed target is to be accurately known.

Figure 3:
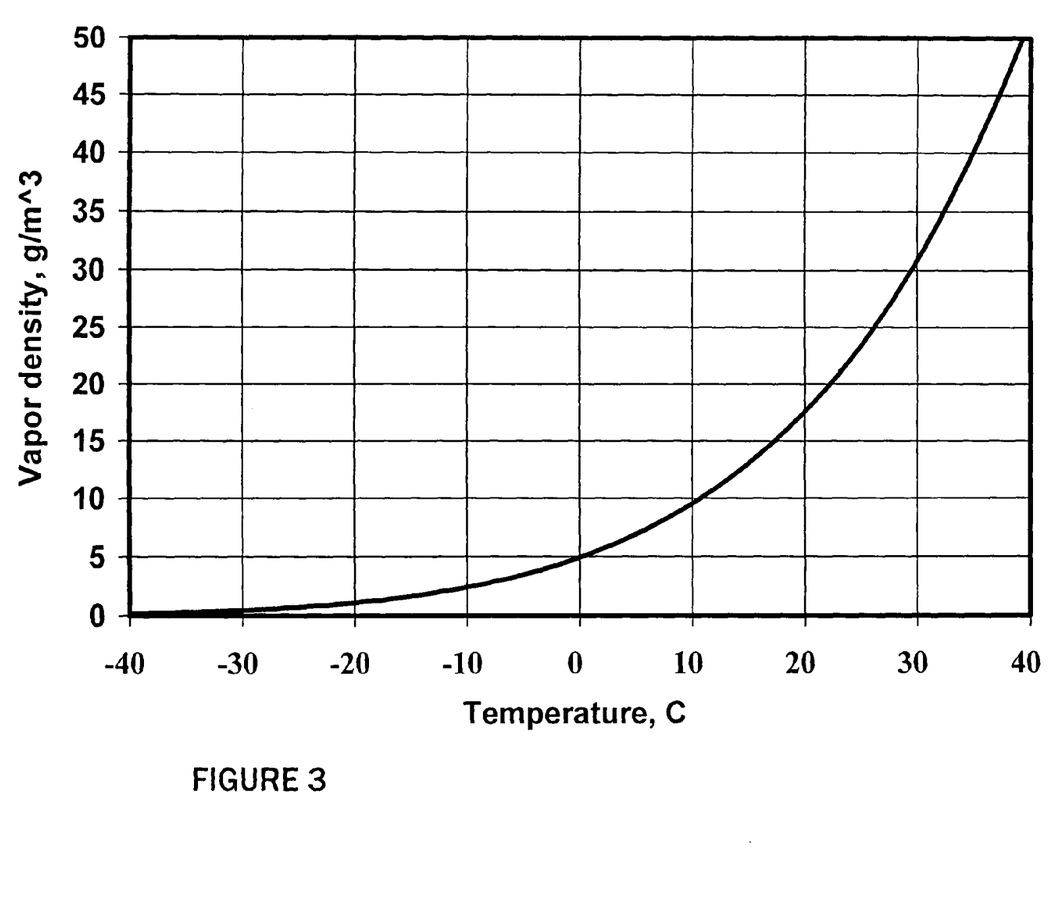
FIG. 3 is a Goff-Gratch graph showing saturation vapor density as a function of temperature.

In atmospheric radiometry applications a tropospheric profiling radiometer such as the RADIOMETRICS CORPORATION MP-3000A can be used to measure altitude profiles of temperature, water vapor, and cloud liquid water by interpreting the inwelling microwave emissions of the atmospheric constituency. Because this measurement method is a passive remote sensing method, the range or vertical resolution is not optimum. However, the temperature profile measurement has the advantage of being constrained by the Perfect Gas Law and the Hydrostatic Equation. Water vapor is not so constrained and can occur at most any altitude in highly structured distributions, constrained only by the temperature dependent saturation vapor density (see FIG. 3). Its spatial distribution is therefore much more difficult to accurately characterize. However, knowing the cloud margin temperature defines the saturation vapor density, and thus the vapor density at that altitude. Such knowledge of the temperature of the cloud base therefore constrains the vapor density at that location on the atmospheric temperature profile and improves the ability of a profiling radiometer to accurately profile atmospheric water vapor.

An infrared thermometer observing from 9.5 to 11.3 microns (see FIG. 1A) can be utilized to measure the infrared emission from, and therefore the temperature and saturation vapor pressure of, cloud margins. Whereas microwave wavelengths pass through clouds, at such infrared wavelengths the emission originates from a shallow thickness of the cloud margin. The atmosphere between the infrared thermometer and cloud margin contributes only a small amount to the received cloud or emitter signal between 9.5 and 11.3 microns (see NB in FIGS. 2A and 2B). This invention offers a method of correcting out this contribution, thereby giving a more accurate temperature datum of the emitter.

Figure 1B:
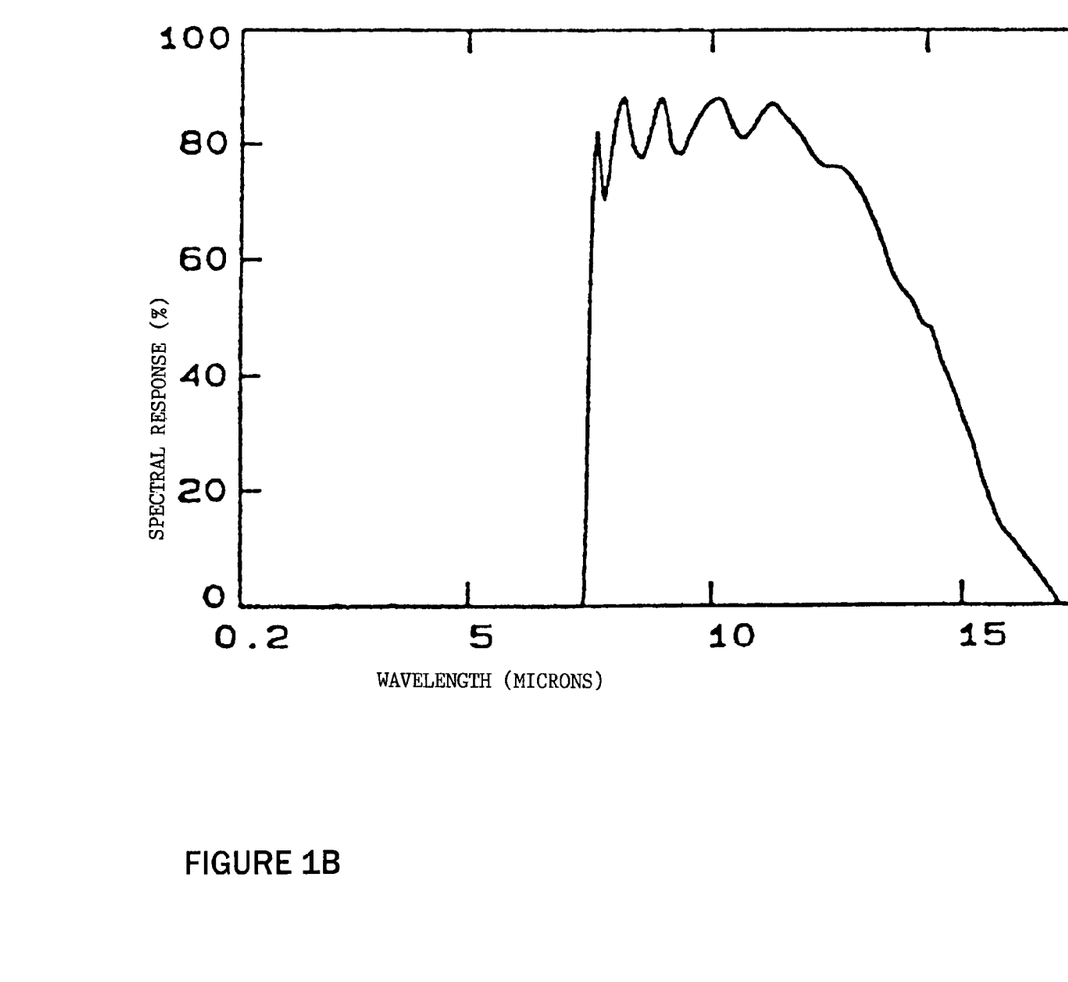

Infrared thermometers with this narrowed bandpass (narrowband infrared thermometers) are expensive and very limited in choice. Commercially available narrowband infrared thermometers are also typically less robust than wideband infrared thermometers. Wideband infrared thermometers operating in the range of about 8 to 14 microns (see the exemplary detector sensitivity chart of FIG. 1B) are inexpensive, about $500 as compared to $6000 for narrowband infrared thermometers currently utilized in this application. However, a significant fraction of the signal within the 8 to 14 micron region outside of the 9.5 to 11.3 micron waveband comes from atmospheric water vapor (see WB in FIG. 2A) and dry constituents such as $CO_2$, ozone, methane, $N_2O$, $NO_2$, and other trace gases (see WB in FIG. 2B) in the atmospheric interval between the infrared thermometer and cloud base.

It would thus be useful to enhance accuracy of temperature measurements by correction of infrared thermometer readings (in either or both narrowband and wideband instruments) for these intervening atmospheric components. Further, in view of the costs with use of narrowband instruments, means and methods for use of wideband infrared thermometers in applications calling for accurate measurements normally not achievable by such instruments would be advantageous. Because provision of narrowband infrared thermometers presently represent a significant fraction of the cost of tropospheric profiling microwave radiometer and other profiling and measurement systems, the ability to utilize a lower cost wideband infrared thermometer would be especially attractive in such applications.

SUMMARY OF THE INVENTION

This invention enables accuracy enhancement of noncontact infrared thermometer data acquired from either narrowband or wideband infrared thermometers by correcting for intervening atmospheric effects. In the present invention, the signal of an infrared thermometer is corrected for the intervening atmospheric emission contribution by separating out the intervening emission from the signal to thereby enhance accuracy of temperature measurements at a cloud margin or other remotely sensed target. Use of the methods of this invention with wideband infrared thermometers enables such enhanced accuracy at much lower hardware cost. For remote sensing applications where the highest accuracy attainable with noncontact infrared thermometry is desired, correction to narrowband infrared thermometers can also be obtained. Use of the methods and apparatus of this invention can be made in the fields of atmospheric radiometry used in atmospheric science and meteorology, look-down airborne measurements of the temperature of the planetary surface, military optical applications such as infrared sensing devices, battlescene visibility and attenuation, heat seeking apparatus, corrections of remotely sensed targets in other fields, and a variety of other applications.

The methods of this invention for enhancing performance of a noncontact infrared thermometer type include determining dry atmospheric constituency and water vapor absorption coefficients specific to the noncontact infrared thermometer type. In an operational mode deploying the noncontact infrared thermometer type to obtain raw target temperature data across an intervening atmosphere, the coefficients are implemented in processing with site-based atmospheric temperature and water vapor density profile and pressure measurements to provide corrected target temperature data compensating for contamination in the raw data due to the intervening atmosphere.

One method for determining water vapor and dry atmospheric constituency absorption coefficients specific to bandpass characteristics of a wideband infrared thermometer to be deployed includes obtaining simultaneous wideband and narrowband cloud margin temperature measurements. These measurements are then processed together with any of measured, modeled, or estimated atmospheric temperature and water vapor profiles to obtain the absorption coefficients.

The apparatus of this invention is provided for enhancing performance of a noncontact infrared thermometer of interest deployed to take temperature measurements of a target across an intervening atmosphere at a measuring locale. The apparatus includes a tunable microwave radiometer co-located with the infrared thermometer for outputting atmospheric temperature and water vapor profiles and a processor connected to receive the profiles and target temperature measurements from the infrared thermometer. The processor has the dry atmospheric constituency and water vapor absorption coefficients specific to the noncontact infrared thermometer of interest stored thereat. The target temperature measurements, profiles and the absorption coefficients are utilized in processing to correct output inaccuracy of the infrared thermometer due to signal contribution from the intervening atmosphere and provide accuracy enhanced target temperature measurement output from the processor.

It is therefore an object of this invention to provide methods and apparatus for accuracy enhancement of noncontact infrared thermometer data acquired from either narrowband or wideband infrared thermometers by correcting for intervening atmospheric effects It is another object of this invention to provide methods and apparatus whereby the signal of an infrared thermometer is corrected for intervening atmospheric emission contribution to enhance accuracy of noncontact temperature measurements at a cloud margin or other remotely sensed target.

It is still another object of this invention to provide methods for determining water vapor and dry atmospheric constituency absorption coefficients specific to bandpass characteristics of a wideband infrared thermometer.

It is still another object of this invention to provide a method for enhancing performance of a noncontact infrared thermometer type that includes the steps of determining dry atmospheric constituency absorption coefficient specific to the noncontact infrared thermometer type, determining water vapor absorption coefficient specific to the noncontact infrared thermometer type, and, in an operational mode deploying the noncontact infrared thermometer type to obtain raw target temperature data across an intervening atmosphere, implementing the coefficients in processing with site-based atmospheric temperature and water vapor density profile and pressure measurements to provide corrected target temperature data compensating for contamination in the raw data due to the intervening atmosphere.

It is yet another object of this invention to provide a method for determining water vapor and dry atmospheric constituency absorption coefficients specific to bandpass characteristics of a wideband infrared thermometer to be deployed that includes the steps of obtaining simultaneous wideband and narrowband cloud margin temperature measurements, and processing the measurements together with any of measured, modeled, or estimated atmospheric temperature and water vapor profiles to obtain the absorption coefficients.

It is still another object of this invention to provide an apparatus for enhancing performance of a noncontact infrared thermometer of interest deployed to take temperature measurements of a target across an intervening atmosphere at a measuring locale that includes a tunable microwave radiometer co-located with the infrared thermometer for outputting atmospheric temperature and water vapor profiles, and a processor connected to receive the profiles and target temperature measurements from the infrared thermometer and having dry atmospheric constituency and water vapor absorption coefficients specific to the noncontact infrared thermometer of interest stored thereat, whereby the target temperature measurements, the profiles and the absorption coefficients are utilized in processing at the processor to correct output inaccuracy of the infrared thermometer due to signal contribution from the intervening atmosphere and provide accuracy enhanced target temperature measurement output.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

To implement narrowband or wideband infrared thermometer types in precise remote measurements of target temperatures of infrared emitters, a mechanism to characterize and correct out the contribution of the intervening atmosphere is needed. First a determination of absorption coefficients of the dry constituency ($kappa_{dry}$ or $k_{dry}$) and water vapor ($kappa_{wv}$ or $k_{wv}$) in the atmosphere in the wavebandpass of the infrared thermometer is made through any of a plurality of techniques. This is a one-time determination for any given infrared thermometer make/model or sensor/filter combination. Measured, modeled or estimated profiles of the atmospheric water vapor, and temperature and pressure profiles and density of the dry atmosphere are utilized, a mathematical processing method being applied to these profiles and the previously determined absorption coefficients to thereby correct out the contributions of these profiles to the infrared thermometer measurements, yielding a more accurate determination of the temperature of the emitter.

There are several methods which may be used to determine the two atmospheric absorption coefficients related to narrowband infrared thermometer. The first implementation requires measurement of the often complex infrared detector spectral response across its infrared bandpass. A line-by-line atmospheric radiation transmission spectrum modeling program such as FASTRAN or LOWTRAN can be implemented to determine the highly structured spectrum of the flux emanating from the intervening modeled or measured atmospheric infrared spectral absorption/emission spectrum spanning this spectral response and arriving at the infrared thermometer from the profiles of temperature, pressure, and water vapor. This line-in-by line spectrum is then mapped against the infrared thermometer sensor response which has to be measured by optical equipment or otherwise characterized. From these measurements and model calculations the intervening atmospheric contribution to the infrared measurement can be calculated, and the requisite dry atmosphere and water vapor coefficients can be determined. This implementation is complex, time consuming and often impractical for many applications.

A second method does not require spectral mapping or line-by-line modeling of the atmospheric absorption. This method is simpler, and determines the effect of the infrared thermometer spectral response and its response to the inwelling atmospheric emission together as one correction. A known or modeled atmosphere 15 (FIG. 4) between a narrowband infrared thermometer 17 (wideband infrared thermometer 19 would not be used in this application) and a target of known temperature and emissivity 21 is utilized. The temperature, pressure, and water vapor distributions (and relative humidity distribution if desired) can be known from in situ measurements (see the examples in FIGS. 3 and 5A, 5B and 5C) such as radiosondes or other in situ measurement devices, or remotely sensed by microwave radiometer 23, Fourier transform interferometer or similar device. Data are captured and processed at processor 25 (a computer for example).

The target is required to be at a temperature in contrast to the average temperature of the intervening atmosphere. This is done for dry atmospheres and again for atmospheres containing a known distribution of water vapor. From these calculations and measurements, the requisite dry atmosphere (kappa$_{dry}$ or k$_{dry}$) and water vapor (kappa$_{wv}$ or k$_{wv}$) coefficients can be determined in accord with processing described hereinbelow referring to FIG. 6. This one-time determination is then utilized operationally to correct out the intervening atmosphere to the narrowband infrared thermometer remote measurements of distant emitters using the processing steps described below referring to FIG. 7.

Figure 4:
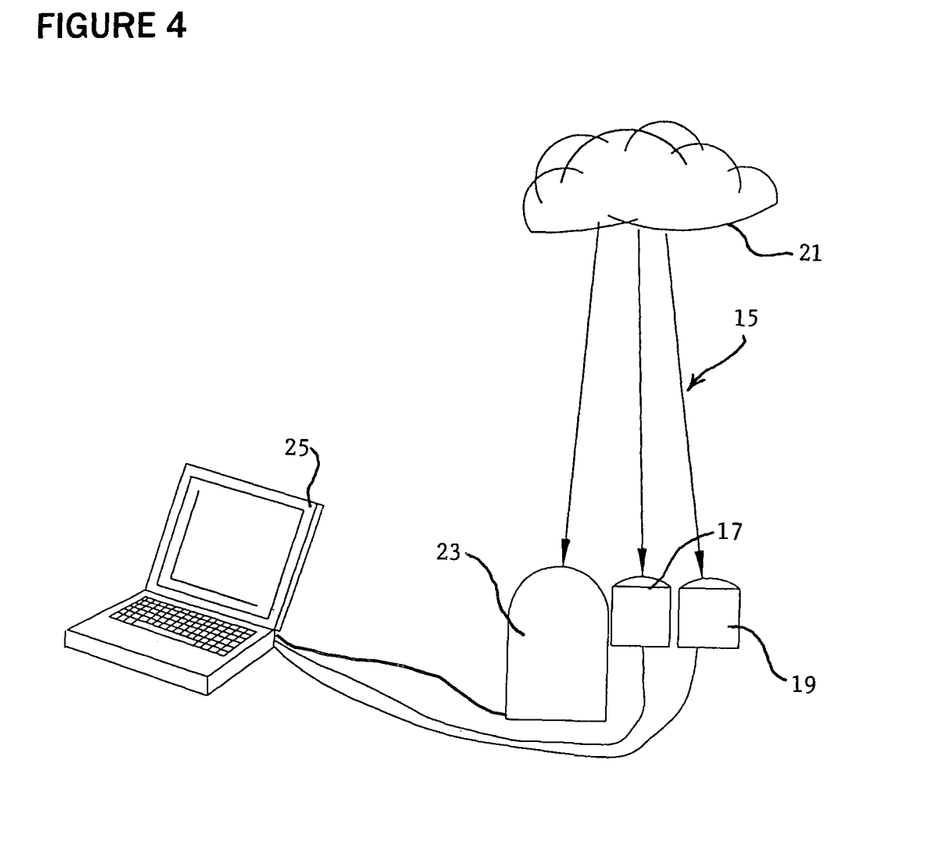
FIG. 4 is a diagrammatic illustration of implementation of one of the method steps of this invention.

For use with wideband infrared thermometers, a simplified method to determine the dry atmosphere and water vapor coefficients characteristic of such thermometers in accord with this invention can be utilized. Wideband infrared thermometer type 19 to be characterized for an application in concert with narrowband infrared thermometer 17 is used as shown in FIG. 4. A distant emitting target such as a cloud 21 brackets an intervening atmosphere 15 and its temperature, water vapor and pressure distributions/constituencies. The distributions can be characterized by a device such as microwave radiometer 23. As noted above, there is a contribution to the signal from the intervening atmosphere in the 9.5 to 11.3 atmospheric window used by most narrowband infrared thermometers that is much smaller in magnitude than that in the 8 to 14 micron waveband typically used by wideband infrared thermometers. In many applications implementing narrowband infrared thermometers, this contribution is ignored. In this application, the narrowband atmospheric contribution may likewise be ignored (it should be realized that for high precision remote measurements of targets, this atmospheric contribution can be corrected out with the above characterization of the bandpass of the narrowband infrared thermometer, and then mapping this against the emission spectrum of the intervening atmosphere as described above).

Profiles of the temperature, water vapor and pressure distribution from the infrared thermometer to the target is determined and applied to processing at processor 25. This data can be acquired from a sensor system such as tropospheric proofing microwave radiometer 23 (as is known—see U.S. Pat. No. 5,526,676), model or other method to make the correction of this invention to the wideband infrared thermometer. In order to implement such a correction, the inwelling spectrum must be characterized by knowing the water vapor, temperature and atmospheric density or pressure distribution between the infrared thermometer and cloud or other target.

The atmospheric profile or distribution of these parameters can be accomplished with any of a number of known technologies such as in situ temperature and relative humidity or water vapor density soundings via radiosondes such as the VAISALA RS92 (RAOBs, weather balloons), aircraft or dropsondes, profiling microwave radiometers such as the RADIOMETRICS CORPORATION MP-3000 series, Fourier Transform Infrared Interferometric Spectroscopy (FTIR) such as the BBBAERI manufactured by BOMEM, Radar Acoustic Sounding Systems (RASS) in concert with wind radars such as the VAISALA LAP-3000, Numeric Weather Models such as WRF, MM5, or RUC, or by profiles estimation (based on any number of data sources or not data at all). In the case of horizontal measurements, many of the above methods can be utilized.

The preferred embodiment of the present invention allows this correction without such complex measurements and computer calculations, thereby attaining the accuracy of more expensive 9.5 to 11.3 micron (narrowband) infrared thermometers with wideband (8 to 14 micron) infrared thermometer cost efficiency. Broadband, rather than line-by-line, corrections are made utilizing previously evaluated simplified coefficients as taught in more detail hereinbelow. In the case of atmospheric applications, the resultant improved measurement of cloud margin temperature defines the saturation vapor density at that location (see FIG. 3), which in turn can be utilized to improve the radiometric measurement of the water vapor profile (and which in turn can be used to refine the temperature measurement correction in accord with this invention it an iterative process). Additionally, because the target temperature is known, if the temperature profile is known, the range or altitude of the target can be determined by locating the target temperature along the temperature profile. This is then a synergistic system that can utilize remotely sensed temperature and water vapor profiles, calculate the pressure profile, and then apply these profiles to improve or refine the accuracy of these very same profiles.

As is known, infrared thermometers typically have a window or lens as an interface to the outside world. To minimize signal loss through this interface, materials such as zinc sulfide, zinc selenide, germanium, silicon, or potassium bromide are used as the window or lens material. To minimize the reflective losses at the surfaces of the interface, antireflective coatings are applied. These are generally dielectrics and, as is the case with most of the above mentioned lens materials, do not tolerate outdoor environments well. Therefore, an environmentally hardened coating such as carbon (also known as DLC—diamond-like coating) and AMTIR (amorphous materials transmitting infrared) materials are applied to the external surface of the window or lens that is exposed to the environment.

The radiation intensity at frequency v observed at an infrared thermometer of inwelling radiation from a non-scattering atmosphere (absence of hydrometeors, clouds) can be expressed using a modified form of the integral form of Chandrasekhar's Radiative Transfer Equation (RTE) for radiative propagation through an interactive medium:

$$I(v) = \int_{IRT}^{\infty} T(h)\alpha(v,h) \exp(-\int_{IRT}^{h} \alpha(h')dh')dh + I_{cosmic} \exp(-\int_{IRT}^{\infty} \alpha(v,h)dh)$$

where I(v) is the received intensity at the infrared thermometer at frequency v, $I_{cosmic}$ is the residual Big Bang radiation originating from outer space, T(h) is the atmospheric temperature at height h above the infrared thermometer, and a(v,h) is the atmospheric absorption at frequency v and height h above the infrared thermometer.

Optical depth or opacity τ is defined by the integral in the exponent in the above expression:

$$\tau = \int_{IRT}^{\infty} \alpha(v,h)dh$$

In the case of the presence of a cloud, the cosmic background contribution is masked by the cloud, and we can substitute the cloud base temperature (cb) for the cosmic background temperature:

$$I(v) = \int_{IRT}^{cb} T(h)\alpha(v,h) \exp(-\int_{IRT}^{h} \alpha(h')dh')dh + I_{cb} \exp(-\int_{IRT}^{cb} \alpha(v,h)dh)$$

The above equation can be linearized by defining the Mean Radiating Temperature $T_{mr}$ of the intervening atmosphere from the Mean Value Theorem of Calculus:

$$T_{mr} = \frac{\int_{i=0}^{\infty} \alpha_i T_i \delta s_i}{\int_{i=0}^{\infty} \alpha_i \delta s_i}$$

Thus we can write:

$$T_B = (1-e^{-\tau})T_{mr} + T_{cb} e^{-\tau}$$

where $T_B$ is the temperature observed by the infrared thermometer. For an exact solution and result, the absorption of the intervening atmosphere of the emission in the interval from higher in the atmosphere to the infrared thermometer (or in the case of range, more distant from the infrared thermometer) should be considered in a complete radiative transfer model calculation along the transmission path. But, as this absorption is very small, typically ~0.1 neper for such small intervening τ, typical of the atmosphere in this waveband, we can expand the exponential to two terms:

$$e^{-\tau} = 1 - \tau + \frac{\tau^2}{2} \ldots \simeq 1 - \tau$$

and separate the contributions of the opacities of the dry constituency and of water vapor, as they are additive. We can then write:

$$T_B = \tau T_{mr} + (1-\tau)T_{cb} = (\tau_{dry} + \tau_{wv})T_{mr} + (1 - \tau_{dry} - \tau_{wv})T_{cb}$$

Solving this expression for cloud margin or cloud base temperature $T_{cb}$:

$$T_{cb} = \frac{T_B - (\tau_{dry} + \tau_{wv})T_{mr}}{1 - \tau_{dry} - \tau_{wv}}$$

So the infrared thermometer temperature correction to be added to the infrared thermometer reported value to obtain true cloud base temperature is:

$$\delta T_B = T_{cb} - T_B = \frac{(\tau_{dry} + \tau_{wv})(T_B - T_{mr})}{1 - \tau_{dry} - \tau_{wv}}$$

Note that this expression is very sensitive to the value of $T_{MR}$ because $T_{MR}$ is very close to $T_B$ in value. Now, opacity τ can expressed as a summation rather than in integral form to accommodate the discrete reporting altitudes generally associated with tropospheric parameter profiling systems:

$$\tau = \sum_{IRT}^{cb} \alpha_i \delta s_i = \kappa \sum_{IRT}^{cb} \rho_i \delta s_i \text{ so}$$

$$\tau T_{mr} = \sum_{IRT}^{cb} \alpha_i T_i \delta s_i = \kappa \sum_{IRT}^{cb} \rho_i T_i \delta s_i$$

where k is the extinction coefficient. Thus we could also write:

$$\delta T_B = \frac{\left(\kappa_{dry} \sum \rho_{i,dry} \delta s_i + \kappa_{wv} \sum \rho_{i,wv} \delta s_i\right)T_B - \kappa_{dry} \sum \rho_{i,dry} T_i \delta s_i - \kappa_{wv} \sum \rho_{i,wv} T_i \delta s_i}{1 - \kappa_{dry} \sum \rho_{i,dry} \delta s_i - \kappa_{wv} \sum \rho_{i,wv} \delta s_i}$$

where the four summations (Numeric Integrals) are evaluated from the surface to cloud base or target by numerical integration along the microwave radiometer-obtained or other profiles of temperature and water vapor from the infrared thermometer to cloud base or target, and the subscripts dry and wv refer to the dry constituency of the atmosphere and water vapor, respectively. This expression is less sensitive to errors in $T_{MR}$.

Figure 6:
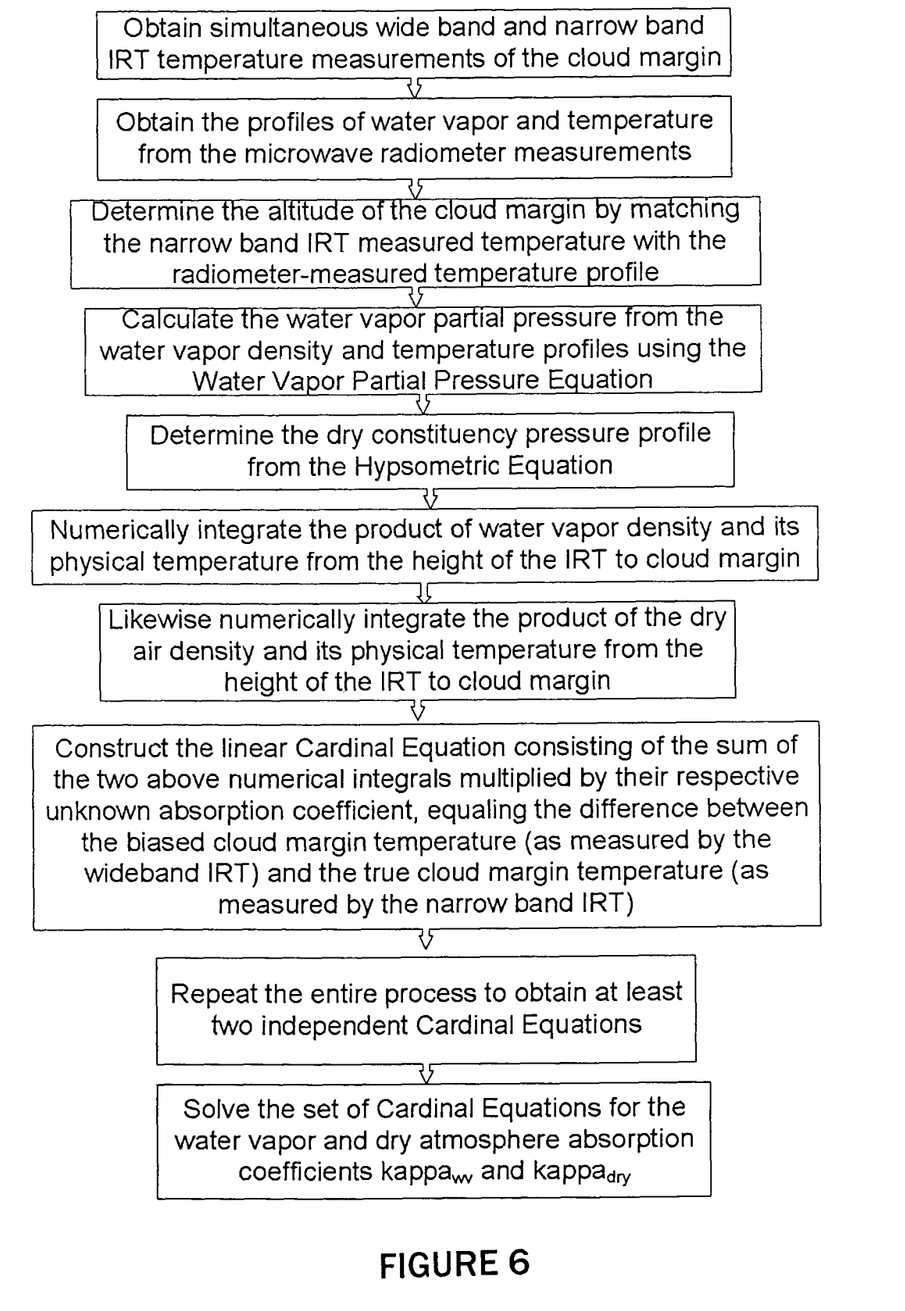
FIG. 6 is a flowchart illustrating one of the processing stages of the methods of this invention.
Figure 7:
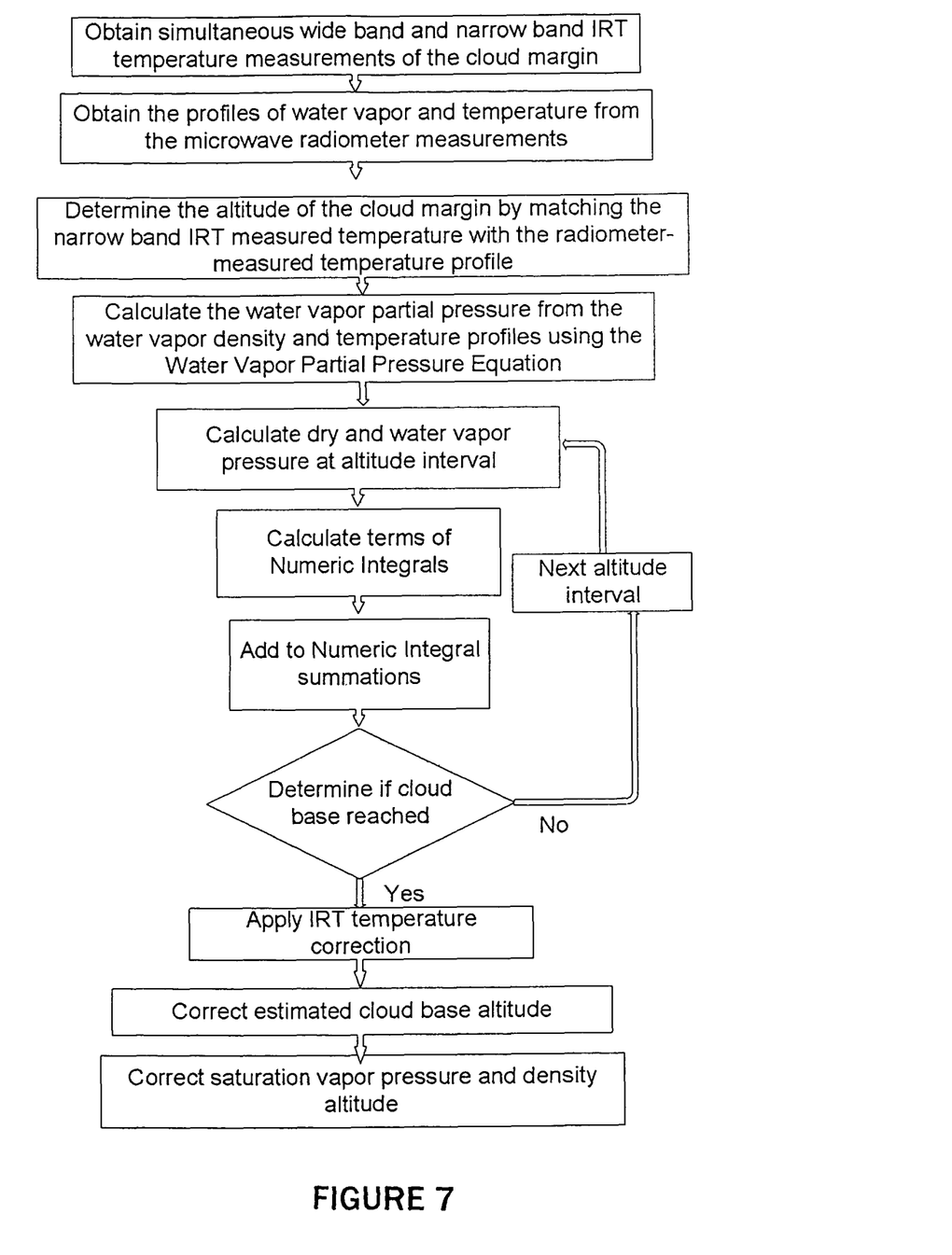
FIG. 7 is a flowchart illustrating the other of the processing stages of the methods of this invention.

There are essentially two stages, or steps, to implementing the preferred embodiment of this invention. The first, as shown in FIG. 6, is to determine in processing the requisite absorption coefficients of the dry atmospheric constituency (kappa$_{dry}$ or k$_{dry}$) and water vapor (kappa$_{wv}$ or k$_{wv}$) specific to the wideband infrared thermometer sensor type. This involves employing a narrowband infrared thermometer in concert with the wideband infrared thermometer of interest (i.e., to be characterized) as shown in FIG. 4, as well as a profiling microwave radiometer or other profile determination means to measure the atmospheric temperature, pressure, and water vapor profiles. The second stage, or step, is implementation of these coefficients in processing utilizing an operational mode with the wideband infrared thermometer previously characterized, also utilizing the atmospheric temperature, pressure, and water vapor profiles then extant, as shown in FIG. 7.

Turning to FIG. 6, processing at processor 25 running programming in accord with the illustrated steps is described. One method of obtaining the absorption coefficients for the well-mixed dry components of the atmosphere and the water vapor across the wideband infrared thermometer spectral bandpass is to take data with co-located narrowband infrared thermometer 17 (such as a Heitronics KT15) and wideband infrared thermometer of interest to be deployed 19 (for example, a Raytek MI series) under a variety of humidity conditions, and preferably with cloud range at a high altitude or large target range so that significant difference signal is obtained. From these measurements and concurrent measurements of the distribution of temperature, water vapor, and pressure along the line-of-sight path, separate absorption coefficients for water vapor and for the dry constituency can be obtained. An alternative method wherein the target temperature can be accurately known is to utilize this known temperature rather than that of the collocated and concurrent narrowband infrared thermometer temperature measurement.

Fortunately, the difference in measured cloud base temperatures between a narrowband infrared thermometer and a wideband infrared thermometer is typically only several degrees. So for most applications a highly skilled correction method is not required. Therefore, determination of the absorption coefficients can be greatly simplified if their slight temperature dependence is ignored in the computations. The small atmospheric contribution to the narrowband infrared thermometer can likewise be ignored, or otherwise estimated.

In the preferred embodiment of the methods of this invention, wideband infrared thermometer 19 is operated in synergistic concert with tropospheric profiling microwave radiometer 23 for the one-time determination of atmospheric absorption coefficients characteristic of the wideband infrared thermometer. The processing steps of the one-time determination of the absorption coefficients for the dry constituency and water vapor utilizing a cloud as the distant emitting target (as illustrated in FIG. 6) include obtaining simultaneous wide-band and narrowband infrared thermometer temperature measurements of the cloud margin or other target. In the alternative, the cloud margin or target temperature can be determined from another precise measurement and, should this alternative temperature measurement be available, the small absorption coefficients characteristic of the narrowband infrared thermometer can also be determined by like methodology.

Figure 5A:
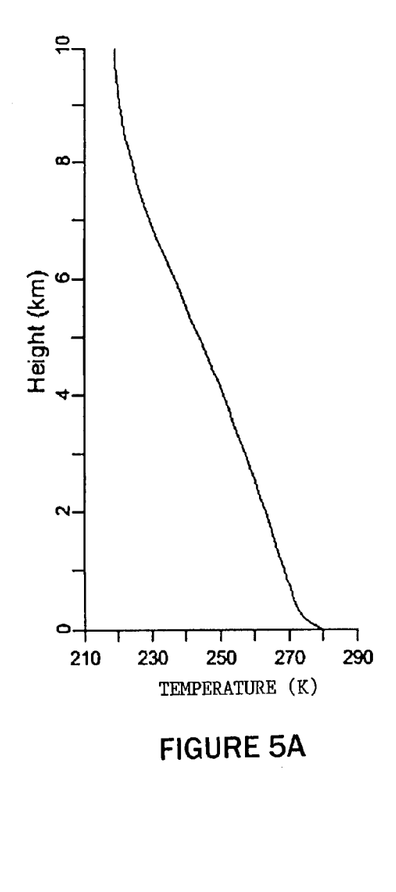
FIGS. 5A through 5C are graphs illustrating temperature, water vapor and relative humidity profiles obtained in performance of the methods of this invention using a profiling microwave radiometer.
Figure 5B:
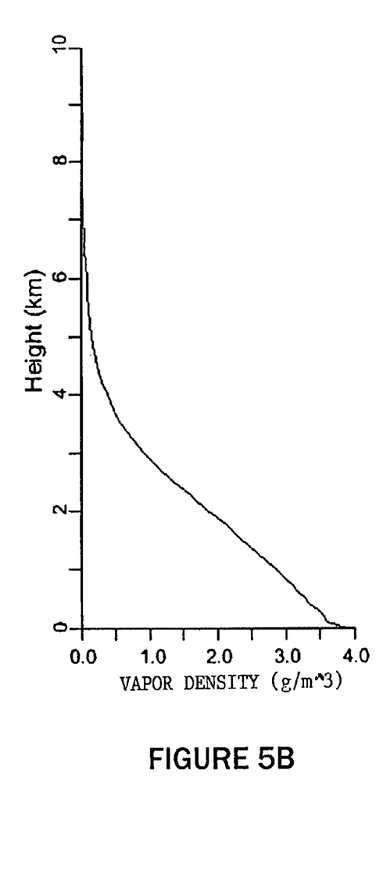
Figure 5C:
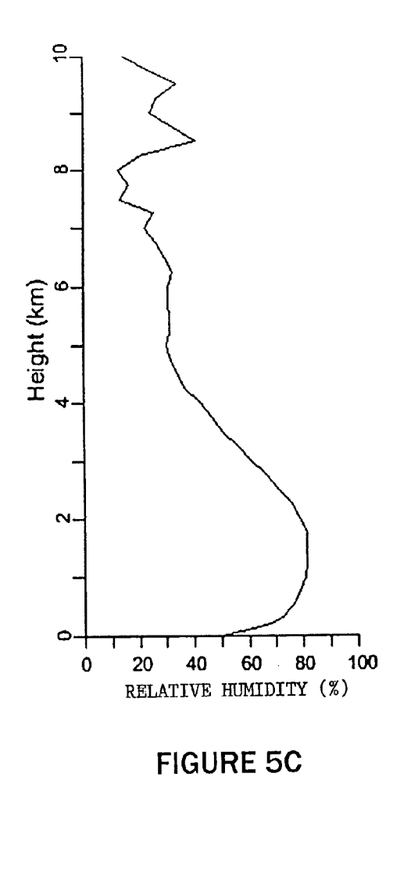

The profiles of water vapor and temperature from microwave radiometer 23 measurements, or the like, are obtained (for example, as shown in FIGS. 5A and 5B), and the altitude of the cloud margin is determined by matching the narrowband infrared thermometer measured temperature with the radiometer-measured temperature profile. A water vapor partial pressure profile is calculated from the water vapor density and temperature profiles using the Water Vapor Partial Pressure equation. For determination of water vapor partial pressure, which needs to be subtracted from total pressure to determine the dry constituency pressure, and then dry constituency density, at each altitude:

$$e = \frac{T\rho_{vap}(g/m^3)}{300 \cdot 7.223}kPa = \frac{T\rho_{vap}(g/m^3)}{300 \cdot 0.7223}mb = 0.00461 \cdot T\rho_{vap}(g/m^3)mb$$

where e is the partial pressure of the water vapor, $\rho_{vap}$ is the water vapor density profile measured by the radiometer, kPa is pressure in units of kiloPascals, and mb is pressure in units of millibars.

The dry constituency pressure profile is determined from the Hypsometric Equation. The pressure at a given level $P_{total,i}$ can be determined from the Hypsometric Equation, the local temperature, and the pressure at the previous layer. Using the Perfect Gas Law: $P=\rho RT$ and the Hydrostatic Equation: $dP=-\rho g dz$ and combining and solving for dz:

$$P = \rho RT$$

$$dz = \frac{RT}{g}\frac{dP}{P} = \frac{R\overline{T}}{g}d(\ln P)$$

we obtain the Hypsometric Equation:

$$\Delta z(\text{meters}) = \frac{R\overline{T}}{g}\ln\left(\frac{P_i}{P_{i-1}}\right) = 29.256\,\overline{T}\ln\left(\frac{P_i}{P_{i-1}}\right)$$

where P is pressure, r is air density, g is the gravitational acceleration constant 9.8 m/sec², z is the vertical coordinate, i is the summation index of the height level, R=gas constant ~287 m²/sec²K, and T is the mean temperature in Kelvins of the layer.

The simplified infrared thermometer temperature correction equation takes the form:

$$\delta T_{atmos} = C'_{dry}\sum_{IRT}^{cb}(P_{total,i} - 0.00461 \cdot T_i\rho_{wv,i})\delta s_i + C'_{wv}\sum_{IRT}^{cb}\rho_{wv,i}T_i\delta s_i$$

where the constants have been gathered into the C' coefficients.

Processing then numerically integrates the product of water vapor density and its physical temperature from the height of the infrared thermometer to the cloud margin. The coefficient $(T_{cb}\Sigma\rho_{i,wv}\delta s_i - \Sigma\rho_{i,wv}T_i\delta s_i)$ is obtained from numerical integration up the radiometer-retrieved temperature and water vapor profiles as measured by the radiometer to cloud base. It then also numerically integrates the product of the dry air density and its physical temperature from the height of the infrared thermometer to the cloud margin. The coefficient $(T_{cb}\Sigma\rho_{i,dry}\delta s_i - \Sigma\rho_{i,dry}T_i\delta s_i)$ is obtained from numerical integration up the radiometer obtained temperature profile and calculated density profiles to cloud base as measured by the radiometer, with the densities $\rho_{dry}$, calculated with the aid of the Hypsometric Equation described above.

A linear Cardinal Equation can then be constructed in processing consisting of the sum of the two above numeric integrals (summations) multiplied by their respective unknown absorption coefficients, equaling the difference between the biased cloud margin temperature (as measured by the wideband infrared thermometer) and the true cloud margin temperature (as measured by the narrowband infrared thermometer). The value of $dT_b$ is obtained from the difference in the concurrent measurements of the Heimann narrowband and Raytek wideband infrared thermometers. At least two such equations must be constructed from differing atmospheric humidity conditions to solve for the two unknown absorption coefficients. If more independent equations can be constructed, a regression or similar technique can be implemented for a "best fit" result. The derivation of the Cardinal Equation follows:

$$(1-\kappa_{dry}\Sigma\rho_{i,dry}\delta s_i-\kappa_{wv}\Sigma\rho_{i,wv}\delta s_i)\delta T_B=(\kappa_{dry}\Sigma\rho_{i,dry}\delta s_i+\kappa_{wv}\Sigma\rho_{i,wv}\delta s_i)T_B-\kappa_{dry}\Sigma\rho_{i,dry}T_i\delta s_i-\kappa_{wv}\Sigma\rho_{i,wv}T_i\delta s_i$$
$$(\kappa_{dry}\Sigma\rho_{i,dry}\delta s_i+\kappa_{wv}\Sigma\rho_{i,wv}\delta s_i-1)\delta T_B+(\kappa_{dry}\Sigma\rho_{i,dry}\delta s_i+\kappa_{wv}\Sigma\rho_{i,wv}\delta s_i)T_B-\kappa_{dry}\Sigma\rho_{i,dry}T_i\delta s_i-\kappa_{wv}\Sigma\rho_{i,wv}T_i\delta s_i=0)$$

Gathering the coefficients of $k_{dry}$ and $k_{wv}$:

$$((\delta T_b+T_b)\Sigma\rho_{i,dry}\delta s_i-\Sigma\rho_{i,dry}T_i\delta s_i)\kappa_{dry}+((\delta T_b+T_b)\Sigma\rho_{i,wv}\delta s_i-\Sigma\rho_{i,wv}T_i\delta s_i)\kappa_{wv}-\delta T_b=0$$

Rearranging terms, $$\delta T_b=(T_{cb}\Sigma\rho_{i,dry}\delta s_i-\Sigma\rho_{i,dry}T_i\delta s_i)\kappa_{dry}+(T_{cb}\Sigma\rho_{i,wv}\delta s_i-\Sigma\rho_{i,wv}T_i\delta s_i)\kappa_{wv}$$

This is the Cardinal Equation for solving for the coefficients $\kappa_{dry}$ and $\kappa_{wv}$. Note that these coefficients are temperature dependent, and with additional independent equations this temperature dependence could be determined for higher accuracy. But this temperature dependence may be ignored in this analysis to simplify the Cardinal Equations.

Repeating the entire process obtains at least two independent Cardinal Equations. Equations of two unknowns are generated from each sounding analyzed; a minimum of two soundings (providing two sets of equations) are required and must be different in composition (independent) to obtain independent equations. Over-determination through a large number of observations is desired to average down noise in the observations and analysis. Processing then solves the set of Cardinal Equations for the dry atmosphere and water vapor absorption coefficients $\kappa_{dry}$ and $\kappa_{wv}$.

Turning now to FIG. 7, processing at processor 25 running programming in accord with the illustrated steps is described. These steps determine the corrections to the temperature measurement of cloud base or other target made by the wideband infrared thermometer of interest being deployed in field operations. In a preferred operational embodiment of this stage, or step, of the present invention, passive microwave tropospheric profiling radiometer 23 makes the necessary measurements of the distribution of temperature, water vapor, and surface pressure, while target temperature readings are obtained from wideband infrared thermometer 19, all applied to processor 25 (see FIG. 8 further described below).

The previously determined attenuation (absorption) coefficients of water vapor and of the dry constituency of the atmosphere are applied against these distributions, from which Radiative Transfer equations can be applied to obtain the correction to the wideband infrared thermometer measurement to obtain the true cloud margin temperature. An alternative and more direct method is thus enabled by this invention in concert with tropospheric microwave radiometry or other similar temperature and water vapor profiling and cloud distance measurement systems concurrent with low cost infrared thermometer observations. Microwave radiometer 23 measurement can in turn use the cloud margin temperature to improve water vapor profiling by utilizing resulting accuracy enhanced saturation vapor pressure calculation at the cloud or other target margin, and to determine the cloud altitude by comparison of the cloud margin temperature with the temperature profile as measured by the microwave radiometer, thereby constraining the water vapor profile at that altitude with that measurement.

The processing steps include obtaining wideband infrared thermometer raw target temperature data measurements at infrared thermometer 19, obtaining microwave radiometer 23 temperature and water vapor profiles and surface pressure measurements (through ancillary instrumentation), and making an estimate of cloud base height by matching the wide-band infrared thermometer measured temperature to the temperature profile determined by the microwave radiometer. Numeric integrals are begun in a wideband infrared thermometer temperature correction equation: sum from infrared thermometer to cloud base. Vapor pressure and the dry constituency pressure at the present altitude are determined, and then the dry constituency density utilizing the Hypsometric Equation and Water Vapor Partial Pressure Equation from radiometrically determined atmospheric state at that interval (as described above).

The products of the temperature·density and water vapor·temperature profiles at that interval are calculated, the current calculation to numeric integral sums being accumulated added, and a determination is made whether the cloud margin altitude is reached. The wideband infrared thermometer raw data measurements are corrected with results of the numeric integrals in the Cardinal Equation providing temperature corrected data, cloud base altitude is corrected by matching corrected cloud base temperature data to the radiometrically determined temperature profile, and saturation vapor pressure and density at cloud base altitude is thus corrected. The saturation vapor pressure of water at cloud base can be determined from the corrected cloud base temperature and the Goff-Gratch equation:

$$\log_{10} e_s(T) = -0.7903(T_s/T-1)+5.028\log_{10}(T_s/T) - 1.382\times10^{-7}(10^{11.34(1-T/TS)}-1)+8.133\times10^{-3}(10^{-3.491(T^{s/T-1})}-1)+\log_{10} e_s(T_s)$$

and if the cloud base has glaciated, the Goff-Gratch integration over ice is:

$$\log_{19} e_i(T) = -9.097(T_s/T-1)-3.567\log_{10}(T_0/T)+0.8768(1-T/T_0)+\log_{10} e_i(T_0)$$

where $e_s$ is the saturation vapor pressure over water, $e_i$ is the saturation vapor pressure over ice, $e_s(T_s)=1013.2$ mb, T is temperature (Kelvins), $T_s=373.16$ Kelvins, the STP (standard temperature and pressure) steam point, $T_0=273.16$ Kelvins, the STP (standard temperature and pressure) ice point, $m_v$ is the molecular weight of water=18 g/mole, L is the latent heat of condensation (vaporization)=$2.5\times10^{10}$ ergs/g, and R is the universal gas constant=$2.87\times10^6$ cm$^2$/sec$^2$-K.

Correction to the cloud base altitude could be made with the corrected wideband infrared thermometer result and the radiometer measured temperature profile, and the above calculations repeated or summations added to and/or subtracted from the previous result in an iterative process. These altitude corrections are expected to be as great as 1 km for high cloud.

An alternative processing implementation of the second stage shown in FIG. 6 involves mathematical inversion of the microwave radiometer brightness temperatures or other remotely sensed observations such as FTIR. In this embodiment, the operational correction is applied in the Forward Modeling procedure that is utilized to create the relationship between the observing system observables and the atmospheric temperature and water vapor profiles to cloud base. Included in this modeling step is the infrared thermometer correction that is calculated utilizing the previously determined absorption coefficient of water vapor and the dry constituency and the profiles. The Forward Modeling generally consists of a set of possible atmospheric profiles from a priori soundings or physically modeled. A correlative mathematical method such as artificial neural networks or regression methods is then applied to determine the relationship between the infrared thermometer correction and the observing system observable set. This correlative method can be one of many, such as linear regression, artificial neural networks, Bayesian maximum likelihood, Newtonian iterative, or nonlinear regression. This method is somewhat simplified over the previous embodiment in it then does not involve numerical integration up the temperature and water vapor profiles to obtain the correction. Thus, with this embodiment, the infrared thermometer correction can be obtained directly by applying the correlative method to the observing system observables.

Figure 8:
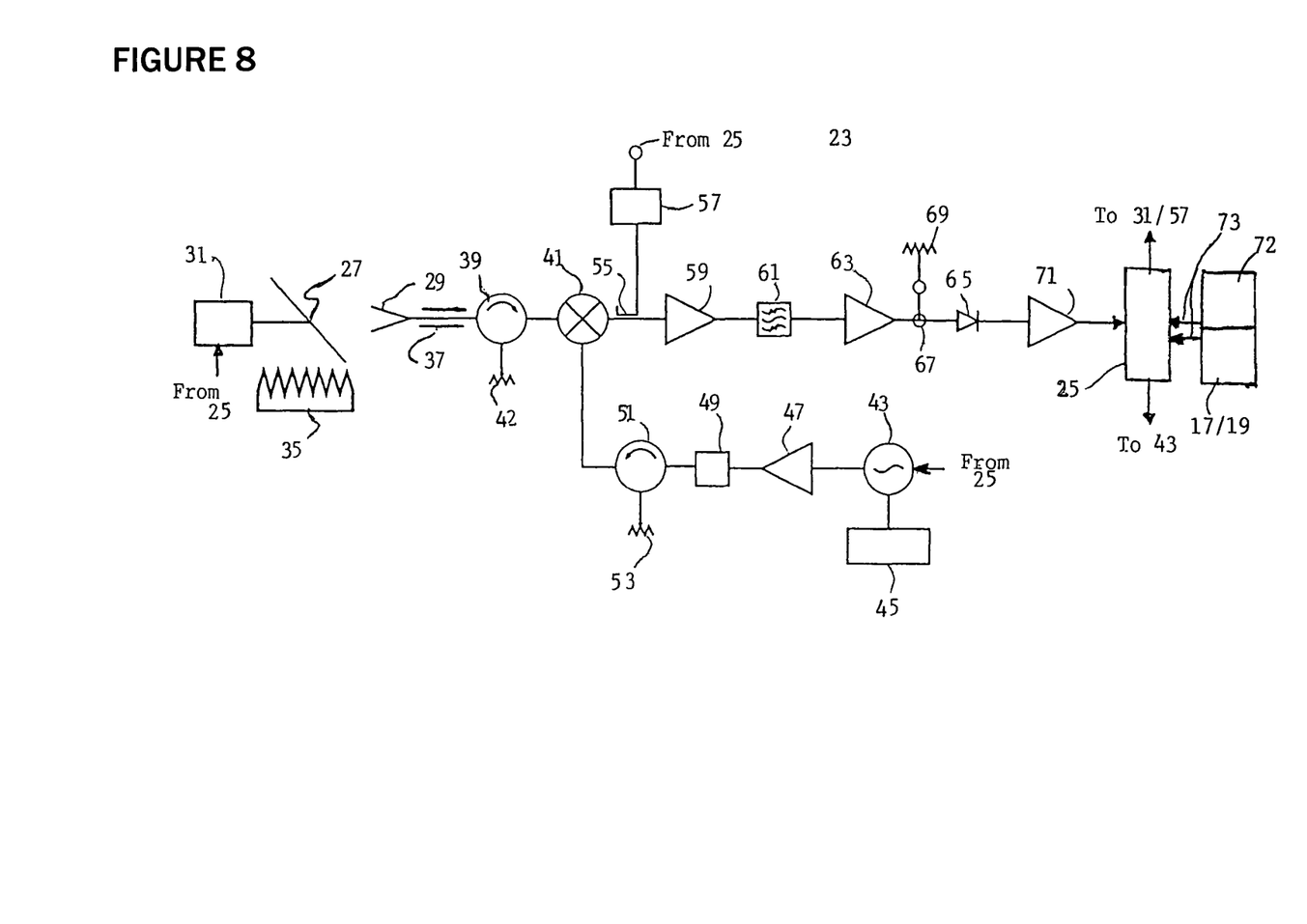
FIG. 8 is a block diagram illustrating apparatus of this invention for implementation of the methods of this invention.

Turning now to FIG. 8, an implementation of this invention with microwave radiometer 23 providing output data to processor 25 is illustrated. Processor 25 receives output indicative of measurements of surface pressure from ancillary instrumentation and distribution of temperature and water vapor in the intervening atmosphere from radiometer 23 and has the water vapor and dry constituency absorption coefficients stored thereon for processing. The radiative transfer equations are resultant of this processing which are applied at processor 25 against output from infrared thermometer 17 or 19 indicative of target temperature measurements to provide the accuracy enhanced target temperature output from the processor.

Highly accurate and sensitive multiple frequency microwave radiometer receiver 23 capable of hyperspectral sampling and receiving a large number of frequencies in a band adjacent to or across selected atmospheric wave water vapor line is shown for obtaining selected profiles used herein. While a specific embodiment is shown, receiver architecture can be variously configured, including, for example, direct amplification and filtering into the desired frequencies, downconverting and separating the downconverted signal into a number of filtered sub-bands, and frequency agile tuning of selected frequencies by the receiver across the desired band. Because of the large number of frequencies economically available to a frequency agile synthesized radiometer and the accuracy of double sideband downconversion architecture, this architecture is preferred over other architectures and is adopted in FIG. 8.

A frequency agile synthesizer is an oscillator device capable of tuning a large number of frequencies by digital or analog control, and referenced to a stable frequency source. Microwave emissions emanating from water vapor and other constituencies of the atmosphere are reflected by microwave mirror 27 and directed to antenna system 29. Mirror 27 can be rotated about a horizontal axis by stepper motor 31 for elevation control responsive to control signals from signal and control processor 33 such that the field of view of antenna 29 can be directed skyward at various angles or toward blackbody 35. Atmospheric signal from antenna 29 is then conducted into rectangular waveguide 37. Waveguide isolator 39 allows signal passage from antenna 29 through to subharmonically pumped balanced mixer 41, but disallows radio frequency energy to pass from mixer 41 back to antenna 29, the energy being directed into resistive load 42. Signals are fed to mixer 41 from tunable local oscillator 43.

Oscillator 43 is phase-lock looped in the architecture of a synthesizer and is frequency stabilized via stable frequency reference 45. Oscillator output frequency is controlled by processor 25. Output of oscillator 43 is multiplied up if by doubler-amplifier 47 and/or frequency tripler 49. The multiplied output is then passed through waveguide isolator 51 to decouple the synthesized frequency source from the input to subharmonic mixer 41. Passed back (reflected) energy is directed by isolator 51 to resistive load 53 in the case of a junction isolator being implemented. Filterbank architecture (20 cavity filters, for example) could be utilized instead of the synthesizer architecture 43 (post down-conversion, a number of available filter types could be used).

Mixer 41 thereby downconverts received atmospheric signals. Coupler 55 injects a highly stable known signal from noise generating diode 57 that is intermittently activated under control from processor 25 as a gain reference for apparatus 23. Output signals from mixer 41 and the noise signal from diode 57 are amplified at amplifier 59 and then filtered at bandpass filter 61. This filtered signal is then amplified at amplifier 63, the output of which is received at detector diode 65. Junction 67 is provided to connect a resistive load 69 in parallel to the signal path. Resistive load 69 allows a current path to ground for detector diode 65. Output signal from detector diode 65 is again amplified at amplifier 71 and output to processor 25.

Ancillary surface meteorological instruments 72 for measurements of temperature, barometric pressure, and relative humidity are provided and signals indicative thereof are received at processor 25 through link 73. Measurement of the temperature of the base of cloud or other target is taken using infrared thermometer 19 (or 17 in the earlier embodiment for narrowband infrared thermometer accuracy enhancement applications) and are provided at processor 25 via link 73 for accuracy enhancing processing of this invention.

As may be appreciated from the foregoing, this invention provides highly economical methods and apparatus for enhancing accuracy of noncontact infrared thermometers, and particularly noncontact wideband infrared thermometers.

What is claimed is:

1. A method for enhancing performance of a selected wideband noncontact infrared thermometer type comprising the steps of:
   providing a linkage between the selected wideband noncontact infrared thermometer type and a microprocessor;
   in the microprocessor, determining dry atmospheric constituency absorption coefficient specific to the selected noncontact infrared thermometer type;
   in the microprocessor, determining water vapor absorption coefficient specific to the selected noncontact infrared thermometer type;
   determining said coefficients across spectral bandpass of the selected wideband infrared thermometer type by the steps of obtaining substantially simultaneous wideband and narrowband infrared thermometer temperature measurements of a cloud margin and providing the temperature measurements at the microprocessor, and, in the microprocessor, determining dry atmospheric constituency absorption coefficient and water vapor absorption coefficient specific to the selected noncontact infrared thermometer type by processing including assembling numeric integrals of product of water vapor density and water vapor physical temperature and product of dry air density and dry air physical temperature from the infrared thermometer to said cloud margin, constructing a first linear cardinal equation consisting of summations of said numeric integrals multiplied by unknown absorption coefficients of each corresponding to difference between said wideband and said narrowband infrared thermometer temperature measurements of said cloud margin, from at least one different atmospheric humidity condition constructing at least a second linear cardinal equation consisting of summations of said numeric integrals multiplied by unknown absorption coefficients of each corresponding to difference between said wideband and said narrowband infrared thermometer temperature measurements of said cloud margin, and utilizing said equations to resolve said unknown absorption coefficients; and in an operational mode deploying the noncontact infrared thermometer type to obtain raw target temperature data across an intervening atmosphere and providing the raw target temperature data at the microprocessor, implementing said coefficients in processing with site-based atmospheric temperature and water vapor density profile and pressure measurements of said raw target temperature data at the microprocessor to provide corrected target temperature data compensating for contamination in said raw data due to said intervening atmosphere.

2. The method of claim 1 wherein the steps of determining dry atmospheric constituency and water vapor absorption coefficients include taking data from the selected wideband infrared thermometer type and a collocated narrowband infrared thermometer having a spectral bandpass narrowed relative to said spectral bandpass of the wideband infrared thermometer type.

3. The method of claim 2 wherein the steps of determining dry atmospheric constituency and water vapor absorption coefficients include taking measurements of distribution of temperature, water vapor and pressure along a line-of-sight path through said intervening atmosphere between said infrared thermometers and said target.

4. The method of claim 1 wherein the steps of determining absorption coefficients include one of:
concurrently taking data with co-located narrowband and wideband infrared thermometers under a variety of conditions including at least one of humidity conditions and target range conditions so that significant difference signal is obtained; or
when target temperature can be accurately known, utilizing said known target temperature.

5. The method of claim 1 wherein said atmospheric temperature and water vapor profiles are obtained from measurements made by a microwave tropospheric profiling radiometer.

6. The method of claim 1 wherein said atmospheric temperature and water vapor profiles are obtained from any one of Radar Acoustic Sounding Systems (RASS), Fourier Transform Infrared Interferometric Spectroscopy (FTIR), in situ radiosonde, aircraft, or dropsonde.

7. A method for enhancing performance of a selected one of either a wideband or narrowband noncontact infrared thermometer type comprising the steps of:
providing a linkage between the selected noncontact infrared thermometer type and a microprocessor;
obtaining simultaneous wideband and narrowband infrared thermometer temperature measurements of a cloud margin and, in the microprocessor, assembling numeric integrals of product of water vapor density and water vapor physical temperature and product of dry air density and dry air physical temperature from the infrared thermometer to said cloud margin, constructing a first linear cardinal equation consisting of summations of said numeric integrals multiplied by unknown absorption coefficients of each corresponding to difference between said wideband and said narrowband infrared thermometer temperature measurements of said cloud margin, from at least one different atmospheric humidity condition constructing at least a second linear cardinal equation consisting of summations of said numeric integrals multiplied by unknown absorption coefficients of each corresponding to difference between said wideband and said narrowband infrared thermometer temperature measurements of said cloud margin, processing said first and second linear cardinal equations to resolve said unknown absorption coefficients and provide first means for determining dry atmospheric constituency and water vapor absorption coefficients, iterating to provide second means for determining dry atmospheric constituency and water vapor absorption coefficients, and processing said means to determine dry atmospheric constituency absorption coefficient specific to the noncontact infrared thermometer type and water vapor absorption coefficient specific to the noncontact infrared thermometer type;

deploying the selected noncontact infrared thermometer type to obtain raw target temperature data across an intervening atmosphere and providing the temperature data at the microprocessor; and in the microprocessor, implementing said coefficients in processing with site-based atmospheric temperature and water vapor density profile and pressure measurements to provide corrected target temperature data compensating for contamination in said raw data due to said intervening atmosphere.

8. The method of claim 7 wherein the step of implementing said coefficients in processing includes making measurements of surface pressure and distribution of temperature and water vapor in said intervening atmosphere and providing output indicative of each to a processor having said absorption coefficients stored thereon.

9. The method of claim 7 wherein the step of implementing said coefficients in processing further includes making an estimate of target height by processing said target temperature data with said temperature profile.

10. The method of claim 9 wherein the step of implementing said coefficients in processing further includes correcting said target height by processing said corrected target temperature data with temperature profile.

11. The method of claim 9 wherein the step of implementing said coefficients in processing further includes correcting measurement of saturation vapor pressure and density at said target height by further processing said corrected target temperature data.

12. The method of claim 11 wherein measurements of distribution of temperature and water vapor are taken at a microwave radiometer collocated with said infrared thermometer type, said method further comprising adaptation by said radiometer in view of corrected saturation vapor pressure measurement to enhance accuracy of radiometer distribution measurements.

13. The method of claim 7 wherein the steps of determining water vapor absorption coefficient and dry atmospheric constituency absorption coefficient further include:
said atmospheric temperature and water vapor profile including any of measured, modeled, or estimated profiles; and
processing said measurements together with said any of measured, modeled, or estimated atmospheric temperature and water vapor profiles.

14. A method for enhancing performance of a selected wideband noncontact infrared thermometer type comprising the steps of:

providing a linkage between the selected wideband noncontact infrared thermometer type and a microprocessor;

obtaining simultaneous wideband and narrowband infrared thermometer temperature measurements of a cloud margin and, in the microprocessor, assembling numeric integrals of product of water vapor density and water vapor physical temperature and product of dry air density and dry air physical temperature from the infrared thermometer to said cloud margin, constructing a first linear cardinal equation consisting of summations of said numeric integrals multiplied by unknown absorption coefficients of each corresponding to difference between said wideband and said narrowband infrared thermometer temperature measurements of said cloud margin, from at least one different atmospheric humidity condition, constructing at least a second linear cardinal equation consisting of summations of said numeric integrals multiplied by unknown absorption coefficients of each corresponding to difference between said wideband and said narrowband infrared thermometer temperature measurements of said cloud margin, processing said first and second linear cardinal equations to resolve said unknown absorption coefficients and provide first means for determining dry atmospheric constituency and water vapor absorption coefficients, iterating to provide second means for determining dry atmospheric constituency and water vapor absorption coefficients, and processing said means to determine said dry atmospheric constituency absorption coefficient and water vapor absorption coefficient specific to the noncontact infrared thermometer type;

deploying the selected wideband noncontact infrared thermometer type to obtain raw target temperature data across an intervening atmosphere and providing the temperature data at the microprocessor; and at the microprocessor, obtaining profiles of water vapor density and temperature across said intervening atmosphere;

in the microprocessor, matching said narrowband infrared thermometer temperature measurements with said temperature profile to determine altitude of said cloud margin;

in the microprocessor, processing said water vapor density and temperature profiles to determine a water vapor partial pressure profile and subtracting said water vapor partial pressure from total pressure to determine dry constituency pressure and dry constituency density at selected altitudes;

in the microprocessor, determining a dry constituency pressure profile in processing with local temperature and previous layer pressure; and in the microprocessor, implementing said coefficients in processing with said profiles and said pressure measurements to provide corrected target temperature data compensating for contamination in said raw data due to said intervening atmosphere.

15. The method of claim 14 further comprising the step of applying said absorption coefficients operationally to correct output inaccuracy of the wideband infrared thermometer.

16. The method of claim 15 wherein said absorption coefficients are applied to determined dry atmospheric constituency and vapor density values in an atmospheric layer-by-layer numerical integration from the wideband infrared thermometer to the cloud margin.

17. The method of claim 14 further comprising:
processing said output and said coefficients at the microprocessor to provide radiative transfer equations;
making measurement of temperature of the cloud margin across the intervening atmosphere at the wideband infrared thermometer type and providing thermometer output indicate thereof to the microprocessor; and
applying said radiative transfer equations to said thermometer output at the microprocessor to provide accuracy enhanced target temperature output.

18. The method of claim 14 further comprising:
accumulating numeric integral sums from the wideband infrared thermometer type to said target; and
determining in processing vapor pressure and dry constituency pressure at present altitude, and then dry constituency density at the interval between the wideband infrared thermometer type and said present altitude.

19. The method of claim 18 further comprising:
processing to provide products of temperature·density and water vapor·temperature profiles at said interval and adding said products to said numeric integral sums being accumulated;
determining if said target height is reached; and
then processing to provide corrected infrared thermometer target temperature measurement.

* * * * *